3,138,606
N-β-CYANOVINYL AMIDES AND PROCESS FOR
PREPARING THE SAME
Frank Scotti, Westport, Conn., and Everett J. Frazza, Yorktown Heights, N.Y., assignors to American Cyanamid Company, New York, N.Y., a corporation of Maine
No Drawing. Filed Oct. 9, 1961, Ser. No. 143,583
15 Claims. (Cl. 260—294.9)

This invention relates to novel N-β-cyanovinyl amides and to a process for preparing the same. More particularly, it relates to N-β-cyanovinyl amides which may be represented by the following structural formula

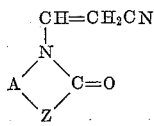

in which Z is selected from the group consisting of

—O—, and —CH$_2$— and A is —(CH$_2$)$_n$— wherein $n$ is a whole integer having a value of 2 to 4 inclusive. The invention also relates to a β-cyanovinyl amide of the formula hereinabove wherein Z and A are each

—CH=CH—

From an inspection of the above depicted formula it will be seen that the N-β-cyanovinyl amides of this invention are compounds having a cyanovinyl grouping attached to the nitrogen atom of a wide variety of cyclic amides.

According to the present invention, such new compounds as those depicted above are readily prepared by condensing a cyclic amide with β-chloroacrylonitrile in an inert reaction medium at a temperature of from about 0° C. to about 100° C. in the presence of hydrogen chloride acceptor. Illustrative of the various materials which may be employed for this purpose are tertiary amines such as triethylamine, N-ethylmorpholine, tributylamine, pyridine, N-methylpyridine and the like. However, it is preferable to employ the alkali metal salt of the cyclic amide reactant and the addition of a tertiary amine as a hydrogen chloride acceptor is then unnecessary. Subsequent recovery of the resultant N-β-cyanovinyl amide is then accomplished by cooling of the reaction mixture and filtration of the by-product alkali metal chloride therefrom. The N-β-cyanovinyl amide thus produced is then recovered by filtration, distillation or other conventional method of separation.

It is a feature of this invention that various cyclic amides of the formula

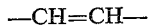

in which Z and A have the values as hereinabove defined may be readily condensed with β-chloroacrylonitrile so as to obtain the corresponding N-β-cyanovinyl amide in good yield. Illustrative amides which may be thus employed in the process of this invention are as follows: 2-pyridone, 2-pyrrolidone, 2-piperidone, the cyclic amide of ω-amino caproic acid, 2-oxazolidone, tetrahydro-2 H, 1,3-oxazin-2-one, tetrahydro-1,3-oxazepin-2(3 H)-one, ethylene urea, tetrahydro-2-(1 H)-pyrimidone and hexahydro-2 H-1,3-diazepin-2-one.

As was pointed out hereinabove, it is preferred that an alkali metal salt of the cyclic amide reactant be employed in order to provide the required basicity of the reaction medium to catalyze the reaction. In this connection, any of various alkali metal salts, e.g., the sodium, potassium and lithium salts, of the respective cyclic amides may be employed with good success in the process. The alkali metal salts of the cyclic amide reactants are readily prepared by treating the corresponding cyclic amide with an alkali metal hydride and subsequently recovering the resultant alkali metal salt of the cyclic amide. Alternatively, the alkali metal salt may be prepared in situ within the reaction mixture by adding an alkali metal hydride to the cyclic amide. However, other methods of preparing these alkali metal salts are also well known and since the formation of such salts forms no part of the present invention it is not deemed necessary to describe detailed methods for their preparation.

The particular reaction medium employed in the process of this invention is restricted only in that it be inert to the reactants and is preferably a solvent therefor. Any of the conventional materials generally employed in this capacity are suitable. Aromatic hydrocarbons such as, for example, benzene, toluene, xylene and the like and their halogenated derivatives such as chlorobenzene, dichlorobenzene and the like; amides such as dimethyl formamide; esters such as ethyl acetate; ethers such as dioxane and the like may thus be used.

While equimolecular quantities of each of the reactants are generally employed, a slight excess of either the cyclic amide reactant or β-chloroacrylonitrile reactant apparently does not influence the over-all rate of reaction or interfere with the recovery of the N-β-cyanovinyl amide product from the reaction mixture.

While temperatures between about 0° C. and about 100° C. are usually employed, it is generally preferred that the process be carried out within a temperature range of from about 25° C. to about 90° C. The time for the reaction to be completed may vary from several hours to about twenty hours depending upon the particular cyclic amide reactant.

Although the order of addition of the reactants is not especially critical, it is preferred that the cyclic amide reactant be added to β-chloroacrylonitrile in order to control the basicity and thus minimize decomposition of β-chloroacrylonitrile.

In order to illustrate the present invention but not to limit it thereto, the following examples in which all parts are by weight unless otherwise indicated are given:

EXAMPLE 1

N-β-Cyanovinyl Pyridone

The sodium salt of 2-pyridone is prepared by the addition of 9.5 parts of 2-pyridone dissolved in a 10% solution of dimethyl formamide in benzene to 4.55 parts of a sodium hydride dispersion also dissolved in a 10% dimethyl formamide-benzene solution. The mixture is then added to a stirred solution of 8.75 parts of β-chloroacrylonitrile in 50 parts benzene maintained at 25° C. The addition is completed in two hours and the resulting black solution is filtered to remove the sodium chloride resulting from the reaction. The solution is then washed with 200 parts of water and the benzene layer is dried over magnesium sulfate. Evaporation of the solution affords a brown crystalline material which is recrystallized from a water-acetone solution and then from methanol yielding 7.7 parts of the substituted product, 53%.

Analysis for C$_8$H$_6$N$_2$O.—Calc'd.: C, 65.74; H, 4.14; N, 19.17. Found: C, 65.56; H, 4.40; N, 19.22.

EXAMPLE 2

N-β-Cyanovinyl Pyrrolidone

The reaction as described in Example 1 is repeated in all its essential respects except that the sodium salt of 2-pyrrolidone is prepared by the addition of 8.5 parts of 2-pyrrolidone to 4.55 parts of a sodium hydride dispersion dissolved in a 10% dimethyl formamide-benzene solution. 10.7 parts of the sodium salt of 2-pyrrolidone is added to a stirred solution of 8.75 parts of β-chloroacrylonitrile in benzene maintained at 25° C. A good yield of N-β-cyanovinyl pyrrolidone having a melting point of 54–55° C. is obtained.

Analysis for $C_7H_9N_2O$.—Calc'd.: C, 61.75; H, 5.92; N, 20.58. Found: C, 61.59; H, 6.04; N, 20.33.

EXAMPLE 3

*N-β-Cyanovinyl-2-Oxazolidone*

The sodium salt of 2-oxazolidone is prepared by the addition of 7.1 parts of 2-oxazolidone dissolved in a 10% solution of dimethyl formamide in benzene to 4.55 parts of a sodium hydride dispersion also dissolved in a 10% dimethyl formamide-benzene solution. This mixture is then added to 8.75 parts of β-chloroacrylonitrile in benzene. The temperature of the reaction is maintained at 30° C. until the reaction is substantially completed. The resulting black solution is filtered and the filtrate is washed with 200 parts of water. Evaporation of the solution affords a brown crystalline material which is recrystallized from ethanol yielding seven parts of N-β-cyanovinyl-2-oxazolidone.

EXAMPLE 4

*N-β-Cyanovinyl Ethylene Urea*

The sodium salt of ethylene urea is prepared by the addition of 8.6 parts of ethylene urea dissolved in a 10% solution of dimethyl formamide in benzene to 4.55 parts of a sodium hydride dispersion also dissolved in a 10% dimethyl formamide-benzene solution. The mixture is then added to 8.75 parts of β-chloroacrylonitrile in benzene. The temperature of the reaction is maintained at 30° C. until the reaction is substantially completed. The resulting black solution is filtered and the filtrate is washed with 200 parts of water. Evaporation of the solution affords a brown crystalline material which is recrystallized from ethanol.

When the procedure of the preceding examples is repeated employing various other alkali metal salts of cyclic amides similar results are obtained.

The N-β-cyanovinyl amides prepared according to the process of this invention are valuable intermediates in the preparation of other compounds. Additionally, N-β-cyanovinyl amides of the general formula set forth hereinabove are capable of being used in agricultural applications as herbicides, fungicides and nematocides and as such they may be used as sprays in organic solvents, as emulsions in water or other non-solvents or on solid carriers such as talcs, clays, diatomaceous earth and the like. Thus, a typical compound of this class, N-β-cyanovinyl pyridone has demonstrated herbicidal, fungicidal and nematocidal activity as is shown from an inspection of the test results appearing in the following tables:

TABLE I

|  | N-β-Cyanovinyl Pyridone | |
| --- | --- | --- |
|  | (0.1%) | (0.01%) |
| Herbicidal Activity, Percent Seed Mortality: |  |  |
| Wheat Seeds | 98 |  |
| Radish Seeds | 84 |  |

TABLE II

| Fungicidal Activity, Percent Germination: | | |
| --- | --- | --- |
| M. fruc |  | 50 |

TABLE III

| Nematocidal Activity, Percent Mortality: | | |
| --- | --- | --- |
| T. Aceti | 75 |  |

Referring to Table I above, a water mixture of the percentage indicated therein of N-β-cyanovinyl pyridone is prepared and seeds of the species representing monocotyledonous and dicotyledonous plants are admixed therewith for a twenty hour period. After this period the seeds are washed and held in a high humidity atmosphere before the percent seed mortality is recorded.

Referring to Table II above, a water mixture of 0.01% of N-β-cyanovinyl pyridone is prepared and spores of the fungus species, *Macrosporium fructigena*, are admixed therewith. After a twenty hour exposure period, the spores are removed from the test vessel and are examined microscopically to determine percent germination.

Referring to Table III above, a water mixture of 0.1% of N-β-cyanovinyl pyridone is prepared and vinegar eel worm nematodes, *T. aceti*, are admixed therewith for a twenty hour period. Immediately thereafter percent mortality is recorded.

Obviously, the compounds of the present invention manifest varying degrees of herbicidal, fungicidal and nematocidal activity and the above illustration is merely typical.

While the present invention has been described in conjunction with various illustrative embodiments and preferred modes of operation, nevertheless it should be understood that numerous other modifications will be apparent to those skilled in the art and that the invention is to be limited only by the appended claims.

We claim:

1. A process for preparing an N-β-cyanovinyl amide of the formula

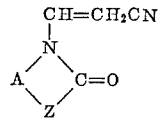

in which Z is selected from the group consisting of

—O—, and —CH$_2$— and A is —(CH$_2$)$_n$— in which $n$ is a whole integer having a value of from 2 to 4 inclusive which comprises bringing into reactive contact an amide of the formula

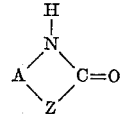

in which Z and A have the values as hereinabove with β-chloroacrylonitrile at a temperature of from about 0° C. to about 100° C. in the presence of a hydrogen chloride acceptor and recovering the resultant N-β-cyanovinyl amide.

2. A process for preparing N-β-cyanovinyl pyridone which comprises bringing into reactive contact 2-pyridone with β-chloroacrylonitrile at a temperature of from about 0° C. to about 100° C. in the presence of a hydrogen chloride acceptor and recovering resultant N-β-cyanovinyl pyridone.

3. A process for preparing N-β-cyanovinyl pyrrolidone which comprises bringing into reactive contact 2-pyrrolidone with β-chloroacrylonitrile at a temperature of from about 0° C. to about 100° C. in the presence of a hydrogen chloride acceptor and recovering resultant N-β-cyanovinyl pyrrolidone.

4. A process for preparing N-β-cyanovinyl-2-oxazolidone which comprises bringing into reactive contact 2-oxazolidone with β-chloroacrylonitrile at a temperature of from about 0° C. to about 100° C. in the presence of a hydrogen chloride acceptor and recovering resultant N-β-cyanovinyl-2-oxazolidone.

5. A process for preparing N-β-cyanovinyl ethylene urea which comprises bringing into reactive contact ethylene urea with β-chloroacrylonitrile at a temperature of from about 0° C. to about 100° C. in the presence of a hydrogen chloride acceptor and recovering resultant N-β-cyanovinyl ethylene urea.

6. A process for preparing an N-β-cyanovinyl amide of the formula

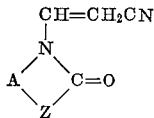

in which Z is selected from the group consisting of

—O—, and —CH$_2$— and A is —(CH$_2$)$_n$— in which $n$ is a whole integer having a value of from 2 to 4 inclusive which comprises bringing into reactive contact an alkali metal salt of an amide of the formula

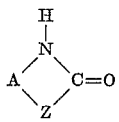

in which Z and A have the values as hereinabove with β-chloroacrylonitrile at a temperature of from about 0° C. to about 100° C. and recovering the resultant N-β-cyanovinyl amide.

7. A process for preparing N-β-cyanovinyl pyridone which comprises bringing into reactive contact an alkali metal salt of 2-pyridone with β-chloroacrylonitrile at a temperature of from about 0° C. to about 100° C. and recovering resultant N-β-cyanovinyl pyridone.

8. A process for preparing N-β-cyanovinyl pyrrolidone which comprises bringing into reactive contact an alkali metal salt of 2-pyrrolidone with β-chloroacrylonitrile at a temperature of from about 0° C. to about 100° C. and recovering resultant N-β-cyanovinyl pyrrolidone.

9. A process for preparing N-β-cyanovinyl-2-oxazolidone which comprises bringing into reactive contact an alkali metal salt of 2-oxazolidone with β-chloroacrylonitrile at a temperature of from about 0° C. to about 100° C. and recovering resultant N-β-cyanovinyl-2-oxazolidone.

10. A process for preparing N-β-cyanovinyl ethylene urea which comprises bringing into reactive contact an alkali metal salt of ethylene urea with β-chloroacrylonitrile at a temperature of from about 0° C. to about 100° C. and recovering resultant N-β-cyanovinyl ethylene urea.

11. An N-β-cyanovinyl amide of the formula

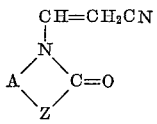

in which Z is selected from the group consisting of

—O—, and —CH$_2$— and A is —(CH$_2$)$_n$— in which $n$ is a whole integer having a value of from 2 to 4 inclusive.

12. N-β-cyanovinyl pyridone.
13. N-β-cyanovinyl pyrrolidone.
14. N-β-cyanovinyl-2-oxazolidone.
15. N-β-cyanovinyl ethylene urea.

No references cited.